H. S. PIERCE.
AUTOMATIC TAKE-UP FOR DRIVE CHAINS.
APPLICATION FILED MAR. 16, 1917.
1,232,391.
Patented July 3, 1917.
2 SHEETS—SHEET 1.
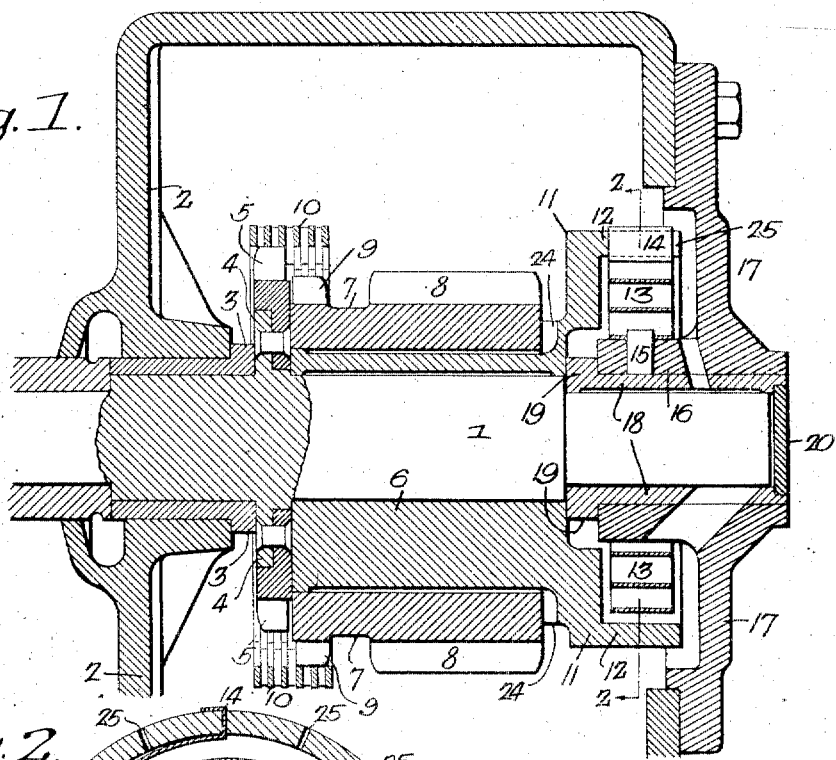
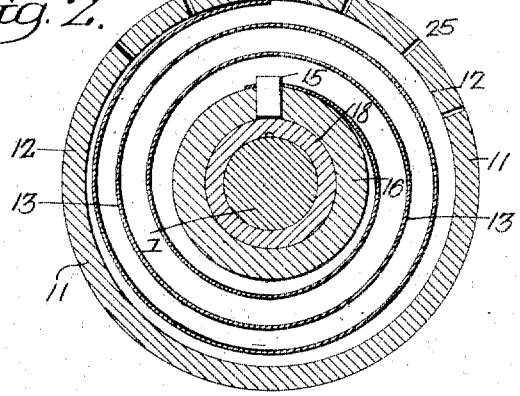
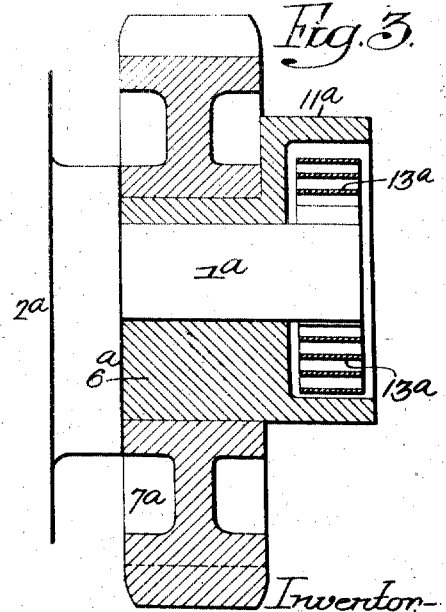
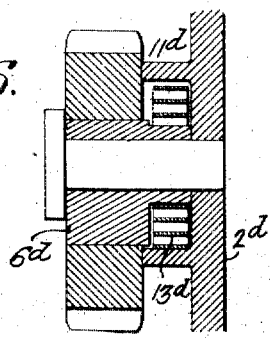
Inventor
Harold S. Pierce.
by his Attorneys H. S. PIERCE.
AUTOMATIC TAKE-UP FOR DRIVE CHAINS.
APPLICATION FILED MAR. 16, 1917.
1,232,391.
Patented July 3, 1917.
2 SHEETS—SHEET 2.
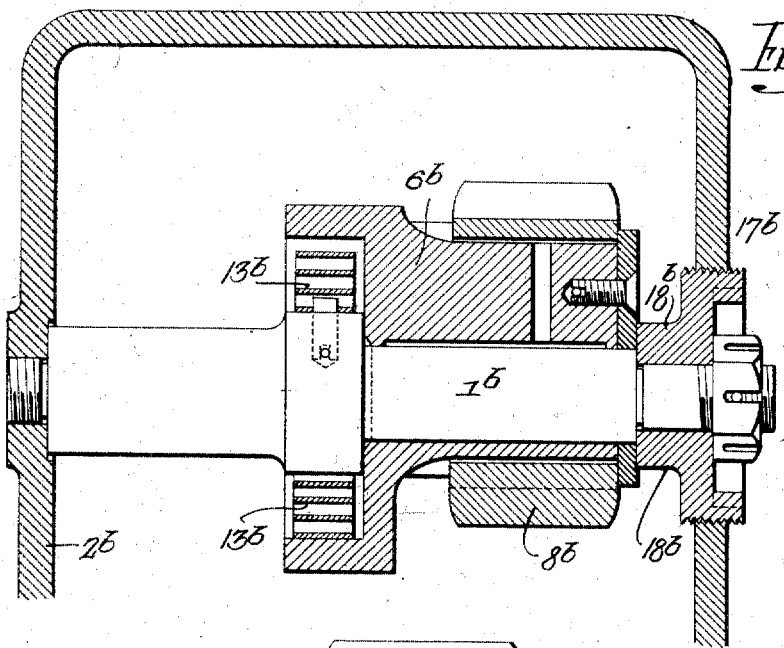
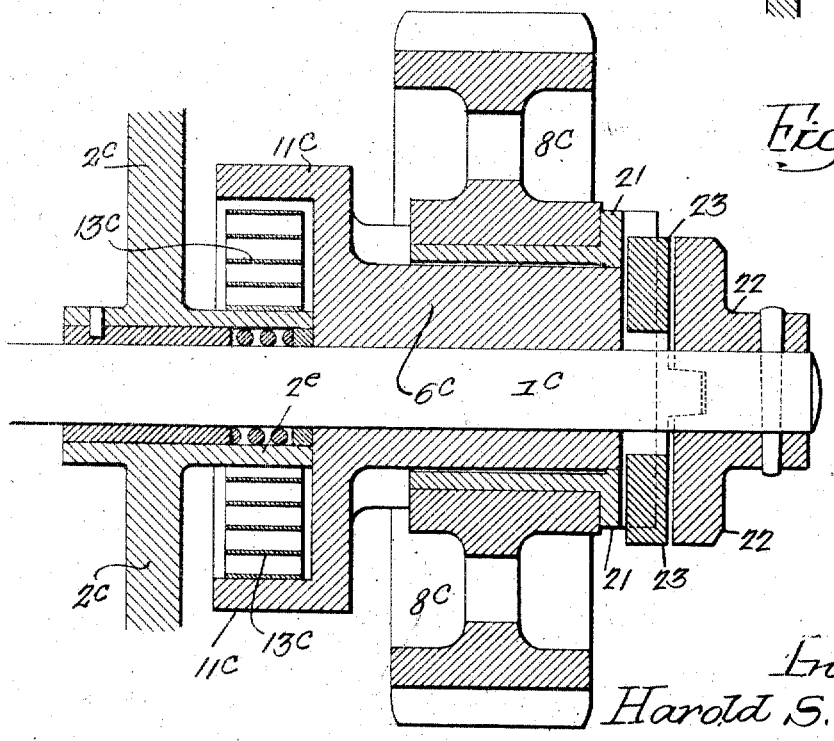
Inventor.
Harold S. Pierce.
by his Attorneys.

UNITED STATES PATENT OFFICE.

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

AUTOMATIC TAKE-UP FOR DRIVE-CHAINS.

1,232,391.   Specification of Letters Patent.   Patented July 3, 1917.

Application filed March 16, 1917. Serial No. 155,311.

*To all whom it may concern:*

Be it known that I, HAROLD S. PIERCE, a citizen of the United States, residing in Philadelphia, Pennsylvania, have invented certain Improvements in Automatic Take-Ups for Drive-Chains, of which the following is a specification.

My invention relates to certain improvements in means for taking up the slack in drive chains such as illustrated in the patents granted to me on August 1, 1916, #1,193,419, and June 20, 1916, #1,188,316.

The object of my invention is to make a more convenient construction and one which is more reliable than that described in either of the above mentioned patents.

In the accompanying drawings:

Figure 1 is a longitudinal sectional view through my improved automatic take up for drive chains illustrating my invention;

Fig. 2 is a sectional view on the line 2—2, Fig. 1;

Figs. 3, 4, and 5 are views illustrating modifications of the take up; and

Fig. 6 is a view of a modification of the take up shown in Fig. 3.

Referring in the first instance to Figs. 1 and 2, 1 is a shaft. 2 is a frame. On the shaft is a bushing 3 adapted to bearings in the frame, and secured to a flange 4 on this shaft is a sprocket wheel 5. 6 is an eccentric hub mounted on the shaft and on this hub is a sprocket wheel 7 having teeth 8 around which the drive chain passes and also teeth 9 at one end which engage the teeth of a chain 10, the chain engaging the teeth 5 and 9, as in Patent #1,193,419. At the end of the hub 6 is an enlargement 11 having a flange 12 inclosing a space in which is located a flat coiled spring 13. One end 14 of this spring extends through a slot in the flange 12, while the other end of the spring is secured by a pin 15 to a hub 16 projecting from a cap plate 17. Mounted between the shaft 1 and the hub 16 is a sleeve 18 which has a flange 19 located between the hub 6 and the hub 16, and at the end of this sleeve 18 is a plate 20 closing the end of the opening for the shaft.

The main drive chain passes around the sprocket wheel 8 and the spring 13 tends to take up the slack and keep the chain taut. It will be seen by this arrangement that the eccentric hub will have a tendency to move so as to take up the slack and yet the spring will yield when subjected to strains and will prevent rattling and will not cause any undue binding of the parts. In order to take up the spring, I provide a series of slots 25 in the flange 12 so that the end of the spring can be located in any one of the slots, as desired.

In Fig. 3, I have illustrated the simplest form of the mechanism in which $1^a$ is a spindle fixed to a frame $2^a$. $6^a$ is the eccentric hub, and $7^a$ is a sprocket wheel. On the hub $6^a$ is a flanged extension $11^a$ and a coiled spring $13^a$ is mounted between this extension and the shaft so that the tendency of the spring is to keep the sprocket chain under tension at all times.

In Fig. 6, I have shown a modification in which a frame $2^d$ has a flange $11^d$ and the hub $6^d$ is extended and the inner end of a flat coiled spring $13^d$ is attached to the hub while the outer end of the spring is attached to the flange.

In Fig. 4, I have illustrated a modification of the invention in which the shaft $1^b$ is in the form of a stud secured to the frame $2^b$. The outer end of the shaft is mounted in a bearing $18^b$ carried by the frame $17^b$. The main sprocket wheel $8^b$ is mounted on the hub $6^b$. There is a flat coiled spring $13^b$ secured to the hub and to the shaft, accomplishing the same purpose as the construction illustrated in Fig. 1.

In Fig. 5, I have illustrated another type of mechanism in which the hub $6^c$ is mounted on a shaft $1^c$. The eccentric hub has a flanged extension $11^c$ and in this extension is located a spring $13^c$, one end of the spring being attached to the end of the extension $11^c$ of the eccentric and the other end to a projection $2^e$ of the frame $2^c$. On the eccentric is a bushing 21 on which is mounted the sprocket wheel and on the end of the shaft $1^c$ is a coupling head 22. In the coupling head is a slot, and in the end of the bushing is another slot at right angles to the slot in the coupling head. A coupling plate 23 is located between the two parts and has projections entering the slots so that this coupling will accommodate itself to the different positions of the parts.

It will be seen that all of these constructions allow the eccentric to be flexibly mounted so as to take up the slack in the drive chain. By making the spring flat and securing it to the flange of the extension of 11 the eccentric and to a projection on the shaft or stud, I am enabled to give the spring a greater delicacy of action than that of the Patent #1,188,316, and I can increase the power of the spring by increasing its width.

The above described mechanism is usually mounted within a casing in which there is a certain quantity of oil which is allowed to splash over the parts, and, in order to lubricate the bearing of the main sprocket wheel on the eccentric bushing, I groove the flange 11, at 24, and, as the eccentric is fixed, the oil dripping from the fixed parts will pass into the grooves 24 and into the space between the sprocket wheel and the eccentric hub.

I claim:

1. The combination in an automatic take-up device, of a sprocket wheel around which a chain passes; an eccentric hub on which the sprocket wheel is mounted; a spindle carrying the hub; and a flat spiral spring mounted between the hub and the spindle and secured to the two parts and arranged to yieldingly hold the hub in position so that when slack occurs in the drive chain it will be automatically taken up by the spring.

2. The combination in an automatic take-up device, of a sprocket wheel around which a chain passes; an eccentric hub on which the sprocket wheel is mounted; an element carrying the hub, one of said parts having a flange; and a flat coiled spring mounted in the space formed by the flange, one end of the spring being secured to one part and the other end of the spring being secured to the other part, so that the spring will automatically take up the slack of the chain.

3. The combination in an automatic take-up for drive chains, of a sprocket wheel around which the chain passes; an eccentric hub on which the sprocket wheel is mounted; a spindle carrying the hub, the hub having a flanged extension forming a recess; and a spiral spring mounted in the recess, the inner portion of the spring being attached to the spindle and the outer end of the spring being attached to the flange of the hub.

4. The combination in an automatic take-up for drive chains, of a sprocket wheel around which the chain passes; a spindle; an eccentric hub mounted on the spindle and having a flanged extension forming a recess; and a spiral spring, the inner end of the spring being attached to the spindle and the outer end of the spring being attached to the flange of the hub, the two attachments being on the same plane so as to avoid unequal bearing of the hub on the spindle.

5. The combination of a spindle; a hub eccentrically mounted thereon and having an enlargement at one end; a sprocket wheel mounted on the eccentric hub; grooves in the enlargement of the hub communicating with the space between the sprocket wheel and the hub, said hub being held in a relatively fixed position with respect to the sprocket wheel; and a casing containing the elements and arranged to receive lubricating oil so that the oil splashed into the parts will flow through the grooves and into the bearing of the sprocket wheel.

6. The combination of a spindle; an eccentric hub mounted on the spindle, said hub having a flanged extension forming a recess; a coiled spring mounted in the extension, the inner end of the spring being attached to a fixture, the flange of the hub having a series of recesses into any one of which the outer end of the spring can be secured so as to allow adjustment of the spring; and a sprocket wheel mounted on the eccentric portion of the hub.

In witness whereof I affix my signature.

HAROLD S. PIERCE.